United States Patent [19]

Nakatsue

[11] Patent Number: 5,351,119
[45] Date of Patent: Sep. 27, 1994

[54] METHOD AND APPARATUS FOR MEASURING A LENS

[75] Inventor: Takehiro Nakatsue, Kanagawa, Japan

[73] Assignee: Asahi Kogaku Kogyo Kabushiki Kaisha, Tokyo, Japan

[21] Appl. No.: 899,301

[22] Filed: Jun. 16, 1992

Related U.S. Application Data

[63] Continuation of Ser. No. 406,522, Sep. 13, 1989, abandoned.

[30] Foreign Application Priority Data

Sep. 13, 1988 [JP] Japan .................. 63-229260
Sep. 13, 1988 [JP] Japan .................. 63-229261

[51] Int. Cl.$^5$ .............................. G01B 9/00
[52] U.S. Cl. .................................. 356/124
[58] Field of Search .................. 356/124–127, 356/124.5

[56] References Cited

U.S. PATENT DOCUMENTS

| | | | |
|---|---|---|---|
| 3,544,796 | 7/1967 | Baker | 356/124 |
| 4,611,913 | 9/1986 | Sugino | 356/127 |
| 4,759,626 | 7/1988 | Kroko | 356/124 |
| 4,818,108 | 4/1989 | Eppinger | 356/360 |

FOREIGN PATENT DOCUMENTS 62-36531  2/1987  Japan .................. 356/124.5

OTHER PUBLICATIONS

Smurty et al. "Measurement of Long Radius of Curvature," Mar./Apr. 1983, pp. 1–5.
"Measurement of Long Radius of Curvature", Murty et al., Mar./Apr. 1983, pp. 1–5.
"University Physics", Sears et al., 1970, p. 577.
"A New Dictionary of Physics", Gray et al., 1975, pp. 30 and 128.
"British Journal of Photography", Jun. 20, 1952, p. 299.

*Primary Examiner*—Richard A. Rosenberger
*Assistant Examiner*—K. P. Hantis
*Attorney, Agent, or Firm*—Sandler, Greenblum & Bernstein

[57] ABSTRACT

A method for measuring an anamorphic lens includes a first step of converging a light beam emitted by a light source towards a reference standard and adjusting the reference standard along the travel direction of the light beam so that the light beam reflected by the reference standard forms a point spread function image or a line spread function image on a focal plane. A second step of replacing the reference standard with an anamorphic lends to be measured and adjusting the same so that the light beam reflected by the anamorphic lens forms a line spread function image on the focal plane, and a third step of measuring the anamorphic by comparing the first step with the second step are provided.

15 Claims, 4 Drawing Sheets

HORIZONTAL SECTION

VERTICAL SECTION

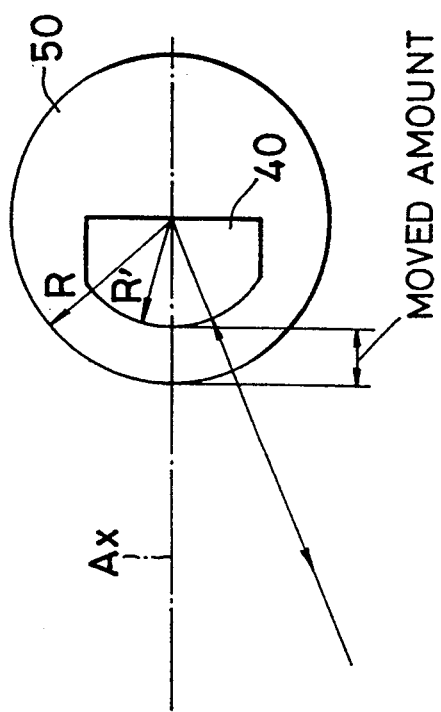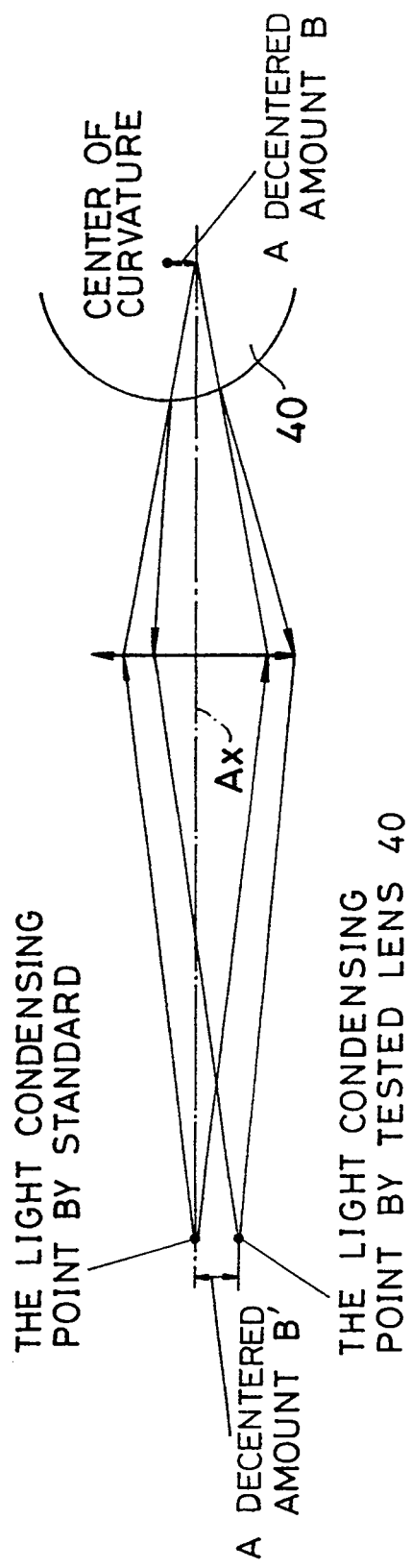

METHOD AND APPARATUS FOR MEASURING A LENS

This application is a continuation of application Ser. No. 07/406,522 filed on Sep. 13, 1989, now abandoned, which is hereby expressly incorporated by reference in its entirety.

BACKGROUND OF THE INVENTION

1. Field of the Invention

This invention relates to a method of measuring the accuracy, etc. of an anamorphic lens which is different in power in the vertical direction and in the horizontal direction (including toric lens, cylindrical lens, etc.) and to an apparatus for carrying out the method.

2. Description of the Prior Art

Heretofore, there has been often used a method employing interference fringes as means for measuring the accuracy of a lens. Particularly in a spherical lens, there has been generally adopted a method in which a Newton plate is used as a handy measuring method.

However, in a case that the anamorphic lens is tested, it is difficult to make a Newton plate, and also it was difficult to determine whether the accuracy of a lens to be processed is coincident with a designed value.

SUMMARY OF THE INVENTION

The present invention has been accomplished in view of the above-mentioned problem.

It is therefore the object of the present invention to provide a method and an apparatus for correctly measuring the accuracy and configuration of an anamorphic lens.

The features of the present invention include a first step of converging a beam of light emitted by a light source toward a reference standard and adjusting the reference standard along the direction of travel of the beam of light so that the beam of light reflected by the reference standard forms a point spread function or a line spread function image on a focal plane; a second step of replacing the reference standard with an anamorphic lens to be tested and adjusting the same such that the beam of light reflected by the anamorphic lens makes a line spread function image on the focal plane; and a third step of measuring the anamorphic lens by comparing the first step with the second step.

Also, a measuring apparatus according to the present invention includes a light source portion, a slide table movable along the travel direction of a beam of light coming from the light source portion, a condenser lens disposed between the light source portion and the slide table and adapted to condense the beam of light emitted by the light source portion, a beam splitter for slitting a beam of light which has been transmitted through the condenser lens after being reflected by a lens mounted on the slide table from an optical path from the light source portion to the condenser lens, and a light receiving portion for receiving the reflected beam of light which was split by the beam splitter.

BRIEF DESCRIPTION OF THE DRAWINGS

FIG. 3 is a schematic view showing the principle of measurement of the radius of curvature according to the measuring method of the present invention;

FIG. 4 is a schematic view showing the principle of measurement of decentering;

DETAILED DESCRIPTION OF THE EMBODIMENTS

The present invention will now be described with reference to the drawings.

Figure 1:
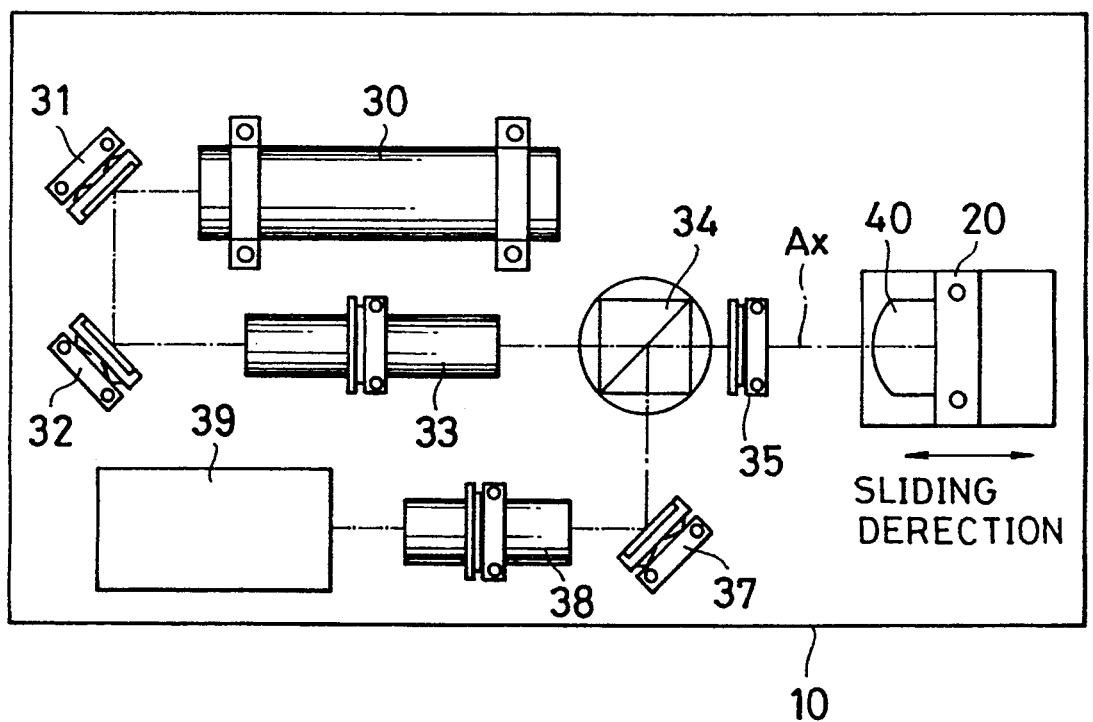
FIG. 1 is a schematic view showing the construction of an apparatus for measuring an anamorphic lens according to one embodiment of the present invention.

FIG. 1 shows one embodiment of an anamorphic lens measuring apparatus according to the present invention.

This apparatus comprises a substrate 10, a slide table 20 slidable with respect to the substrate 10 and adapted to carry thereon an anamorphic lens to be tested, and optical elements as will be described hereinafter.

Reference numeral 30 denotes a He—Ne laser as a light source. A beam of light emitted by this laser 30 is made incident to a beam expander 33 through a first mirror 31 and a second mirror 32.

A parallel beam of light from this beam expander 33 is split into two beams of light by a beam splitter 34. A beam of light, which has been transmitted through the beam splitter 34, reaches the anamorphic lens to be tested 40 set on the slide table 20 through a condenser lens 35 as a condensed beam of light. The, optical axis of the beam of light extending toward the lens to be tested 40 from the condenser lens 35 is indicated by symbol Ax.

A beam of light, which has been reflected by a lens set on the slide table 20, is split by the beam splitter 34, and a part of such split beam of light reaches a CCD camera 39 mounted on a focal plane through an imaging lens 38 and mirror 37.

Figure 2A:
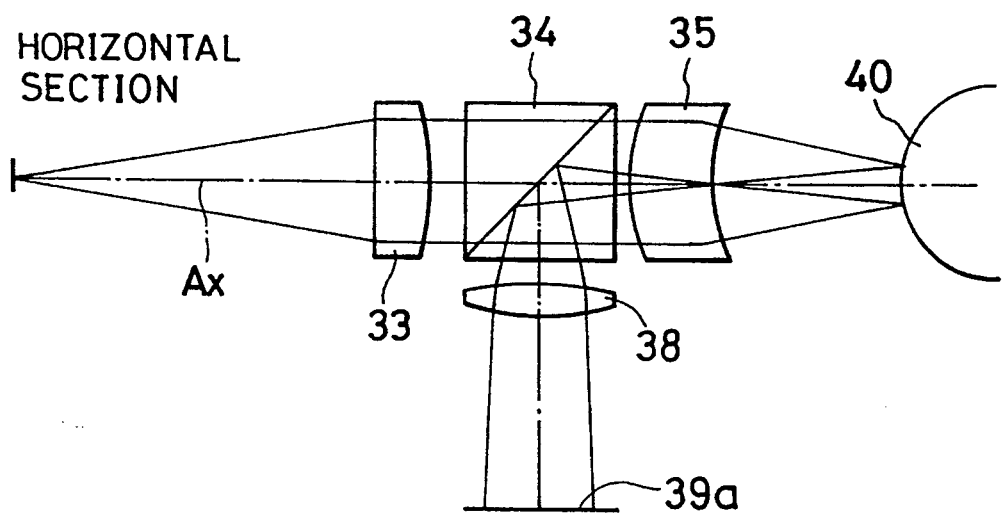
FIGS. 2(A) and 2(B) are sectional views of an optical system shown in FIG. 1.
Figure 2B:
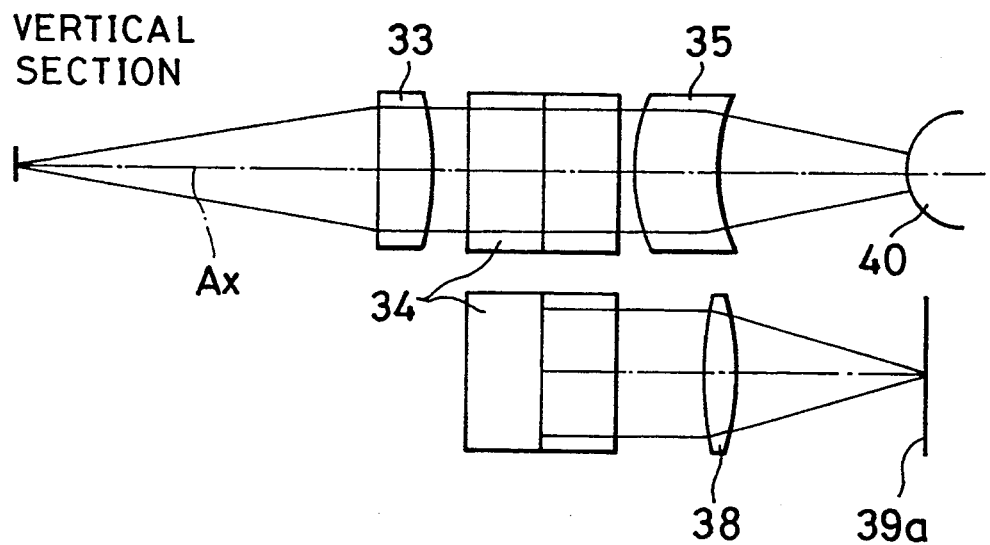

FIGS. 2(A) and 2(B) show one state where the lens to be tested 40 is mounted on the slide table 20 as such that the beam of light emerging from the condenser lens 35 is converged to the radius of curvature of vertical primary meridian direction of the lens to be tested 40. FIG. 2(A) shows an optical path within the same plane (hereinafter referred to as the "horizontal section") to that of FIG. 1 and FIG. 2(B) shows a plane (hereinafter referred to as the "vertical section") vertical to the horizontal section.

When the reflecting surface is spherical, if the incident beam of light is set in such a manner as to be converged to the center of curvature thereof, the reflected light returns along the same optical path to that of the incident light and a point spread function image is formed on a focal plane 39a.

However, when the lens to be tested 40 has a different radius of curvature in the horizontal section and in the vertical section, if the beam of light is converged to the radius of curvature within the vertical section, it is focused onto the focal plane 39a, as shown in FIG. 2(B), within the vertical section. However, the beam of light has a spread on the focal plane 39a, as shown in FIG. 2(A), within the horizontal section and a line spread function image is formed as a whole. The focal plane 39a moves according to the movement of the slide table 20. When an anamorphic lens is measured, the focal plane is made to coincide with the image receiving surface of the CCD camera 39.

When the accuracy of the lens within the vertical plane is a curve other than a circle, such as an ellipse and/or a parabola, the beam of light spreads on the focal plane 39a even within the vertical section. Accordingly, a difference between a curve of the lens and a circle within the vertical section can be measured by measuring the minimum width of the line spread function image which is formed on the focal plane.

A method for measuring an anamorphic lens using the above-mentioned apparatus will be described next.

MEASUREMENT OF RADIUS OF CURVATURE

Measurement of the radius of curvature in one primary meridian direction of a toric surface or measurement of the radius of curvature of a cylindrical surface is performed by detecting a difference with respect to a reference cylindrical standard.

FIG. 3 shows the principle for measuring the radius of curvature. That is, it is established that light reflected by a reference cylindrical standard 50 which has a predetermined correct radius of curvature R and light reflected by a lens to be tested 40 will travel the same optical path. The radius of curvature R' along one primary meridian of the lens to be tested 40 can be obtained from a relation of R' = R-A by obtaining a moved amount A which as moved in the meantime.

Concretely, first, the cylindrical standard 50 is mounted on the slide table 20 and set in a position where a line spread function image is formed on the focal plane 39a (first step).

Thereafter, the standard 50 is removed from the slide table 20 and the lens to be tested 40 is mounted on the slide table 20. Then, the slide table 20 is moved to a position where the line spread function image is formed on the focal plate 39a (step 2). Similarly, in the position where the line spread function image is formed, the incident light is oriented toward the center of curvature and the reflected light returns along the same optical path to that of the standard.

Accordingly, by measuring the moved amount (third step), a difference in the radius of curvature with respect to the standard can be found.

According to the above-mentioned means, even in a case where the surface to be tested is concave, the radius of curvature can be detected in the same procedure.

As the cylindrical lens is easy to measure with a comparatively high accuracy, it is suitable to be used as a standard. However, the standard is not limited to the cylindrical lens but it may be a spherical lens. In a case that the spherical lens is used as the standard, the slide table 20 is adjusted so that a point spread function image is formed on the focal plane 39a in the first step.

MEASUREMENT OF DECENTERING

Next, a method for measuring decentering of the anamorphic lens will be described. FIG. 4 shows the principle of the measurement of decentering, wherein the solid line shows an incident light ray and the broken lines show a reflected light ray.

Even in this case, the decentered amount is measured by comparison with the reference standard. The term "decentering of a lens" as used herein means that the position of the center of curvature of lens to be tested is decentered from the position of the center of curvature of the standard with reference to an abutting surface of a lens which is abutted against the mounting table 20.

As shown in FIG. 4, the light condensing position of the reflected light by the reference cylindrical standard is determined and stared or memorized beforehand, and the standard is then replaced with the lens to be tested 40 so as to detect the light condensing position of the reflected light by the lens to be tested 40.

There can be obtained a decentered amount B along one primary meridian of the anamorphic lens with reference to the decentered amount B' of the light condensing positions and the power of the optical system.

MEASUREMENT OF TILT OF PRIMARY MERIDIAN AND GENERATRIX

Next, there will be described the tilt of a primary meridian of the toric surface or a generatrix of the cylindrical surface with reference to FIGS. 5 and 6. These two figures show horizontal sectional views like FIGS. 1 and 2.

Figure 5:
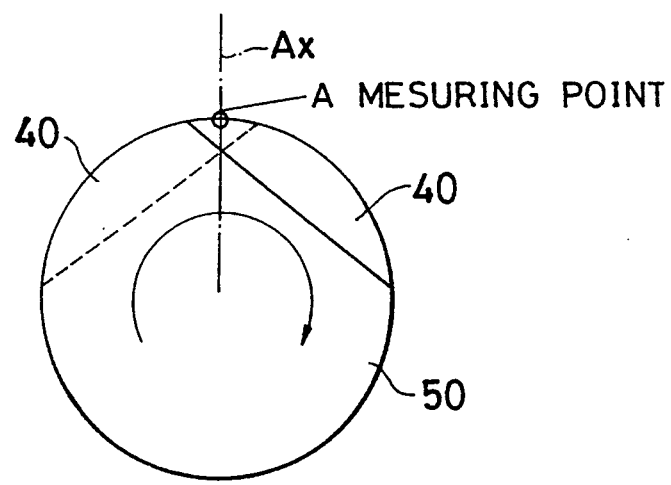
FIGS. 5 and 6 are schematic views showing measurement of tilt of a primary meridian.

When a tilt of the primary meridian in the horizontal sectional direction of the toric surface is measured, first, the lens to be tested 40 which is attached to a circular dish 50 is rotatably set to the slide table and the dish 50 is adjusted (first step) such that one end portion of the lens becomes a measuring point (in the vicinity of the intersecting point with the optical axis Ax) as shown by the broken lines in FIG. 5.

The center of rotation of the dish 50 is the center of curvature within the horizontal section of the lens to be tested 40.

Thereafter, the slide table 20 is adjusted to a position where the beam of light is converged toward the center of curvature in the vertical sectional direction so that the reflected light by the lens to be tested 40 forms a line spread function image on the focal plane 39a.

Then, the dish 50 is rotated in the direction as shown by the arrow in the figure to scan the whole surface of the lens (second step).

As the lens to be tested 40 is rotated about the center of curvature within the horizontal section, the center of intersecting curvature of the vertical section including the optical axis Ax and the toric surface is present within the vertical section including the optical axis Ax. Accordingly, the line spread function image formed on the focal plane 39a by the beam of light is not moved even when the dish 50 is rotated unless the primary meridian in the horizontal sectional direction is tilted.

In a case that the primary meridian is tilted due to unevenness of the polishing to the lens, the line spread function image is formed in a position different from a position where the line spread function image is formed when the decentering does not occur at a point where the actual primary meridian spaced from a predetermined primary meridian.

When the primary meridian is tilted, as the decentered amount is varied at each point, the position of the line spread function image formed on the focal plane 39a in accordance with the rotation of dish 50 is moved. Accordingly, the tilt of the primary meridian in the horizontal sectional direction can be measured by observing the movement of the line spread function image.

Figure 6:
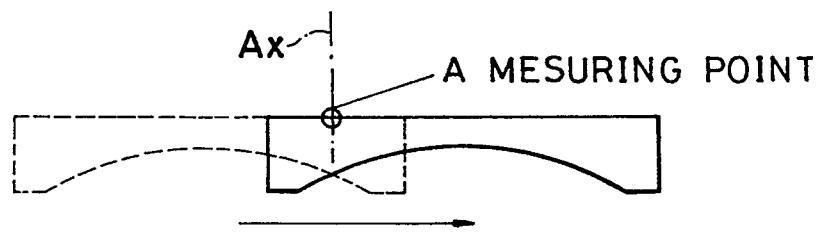

In order to measure the tilt of the generatrix of the cylindrical surface, the surface is moved in parallel relation along the generatrix direction as shown in FIG. 6. In a case that the generatrix is tilted, as it is detected as a decentering at that point, the tilted amount of the whole generatrix can be measured by scanning the whole lens because of the same principle as mentioned.

MEASUREMENT OF PROFILE IRREGULARITY

When a profile irregularity is measured, the lens to be tested is set to the slide table 20 and the table is moved front and back from the position to form the line spread function image, and an image that appears on the focal plane is tested.

Figure 7:
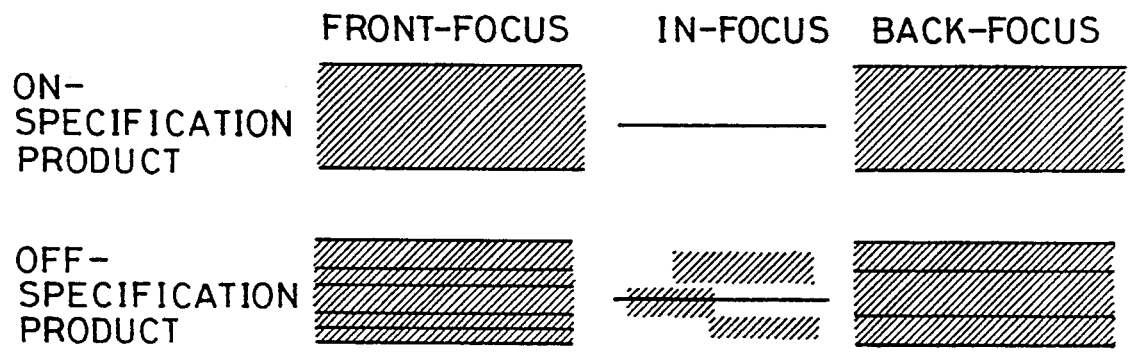
FIG. 7 is a schematic view of an image formed on a focal plane.

FIG. 7 is an explanatory view showing the result of the test of the profile irregularity of the toric surface.

In a case that the toric surface is an on-specification product, a single fine line spread function image is formed when the beam of light is condensed to the center of curvature of the toric surface(a state of in-focus). When the beam is condensed in the foreground(-front-focus) or in the background(back-focus) according to movement of the slide table 20, an uniformly bright portion is formed due to plane hanging outside the effective beam of light of the toric surface.

In a case that the toric surface is an off-specification product, a toric surface has a tiny irregularity, the radius is different at different parts of the surface Accordingly, even if the radius of curvature is generally the same, a line spread function image is formed on the bright portion at front-focus and back-focus due to differences in the radius of its various parts, and a flare appears on its periphery also at the in-focus condition.

Therefore, by evaluating the stage of the image detected by the above-mentioned test, there can be distinguished a on- or off-specification product in respect of profile irregularity.

What is claimed is:

1. A method for measuring an anamorphic lens including:
    a first step of converging a beam of light emitted by a light source towards a reference standard and adjusting the position of said reference standard along the progressing direction of the beam of light so that the beam of light reflected by said reference standard forms a point spread function image or a line spread function image on a focal plane;
    a second step of replacing said reference standard with an anamorphic lens to be tested, and adjusting the position of said anamorphic lens such that the beam of light reflected by said anamorphic lens forms a line spread function image on the focal plane; and
    a third step of measuring said anamorphic lens by comparing said first step with said second step.

2. A method for measuring an anamorphic lens according to claim 1,
    wherein said third step measuring the curvature within a plane including the line spread function image of said anamorphic lens by comparing the adjusted position of said reference standard with the adjusted position of said anamorphic lens.

3. A method for measuring an anamorphic lens according to claim 1,
    wherein said third step measures decentering within a vertical section with respect to the line spread function image of said anamorphic lens by comparing the positions of the images formed on said focal plane by said reference standard and said anamorphic lens at said adjusted positions.

4. A method for measuring an anamorphic lens according to claim 1,
    wherein said step of converging a light beam towards a reference standard comprises utilizing a cylindrical lens as the reference standard.

5. A method for measuring an anamorphic lens including:
    a first step of converging a beam of light emitted by a light source toward a reference standard and adjusting the position of said reference standard along the progressing direction of the beam of light so that the beam of light reflected by said reference standard forms a point spread function image or a line spread function image on a focal plane;
    a second step of replacing said reference standard with an anamorphic lens and adjusting the position of said anamorphic lens such that the beam of light reflected by said anamorphic lens forms a line spread function image on the focal plane; and
    a third step of measuring the curvature within a section including the line spread function image of said anamorphic lens by comparing the adjusted position of said reference standard with the adjusted position of said anamorphic lens.

6. A method for measuring an anamorphic lens according to claim 5,
    wherein said step of converging a light beam towards a reference standard comprises utilizing a cylindrical lens as the reference standard.

7. A method for measuring an anamorphic lens including:
    a first step of converging a beam of light emitted by a light source toward a reference standard and adjusting said reference standard along the progressing direction of the beam of light so that the beam of light reflected by said reference standard forms a point spread function image or a line spread function image on a focal plane;
    a second step of replacing said reference standard with an anamorphic lens and adjusting the anamorphic lens such that the beam of light reflected by said anamorphic lens forms a line spread function image on the focal plane; and
    a third step for measuring decentering within a vertical section with respect to the line spread function image of said anamorphic lens by comparing the positions of the images formed on said focal plane by said reference standard and said anamorphic lens in the adjusted positions.

8. A method for measuring an anamorphic lens according to claim 7,
    wherein said step of converging a light beam towards a reference standard comprises utilizing a cylindrical lens as the reference standard.

9. A method for measuring an anamorphic lens including:
    a first step of converging a beam of light emitted by a light source toward an anamorphic lens and adjusting said anamorphic lens along the progressing direction of the beam of light so that the beam of light reflected by said anamorphic lens forms a line spread function image on a focal plane; and
    a second step of measuring said anamorphic lens by observing changes of the image formed on said focal plane by moving said anamorphic lens.

10. A method for measuring an anamorphic lens according to claim 9,
    wherein said second step detects tilt of a primary meridian of said anamorphic lens by observing changes of the image formed on said focal plane while rotating said anamorphic lens about an axis passing through the center of curvature within a plane where said line spread function image is formed and vertical to said plane.

11. A method for measuring an anamorphic lens according to claim 9,
   wherein said anamorphic lens is a cylindrical lens, and said second step detects tilt of a generatrix of the cylindrical lens by observing changes of the image formed on said focal plane while sliding said cylindrical lens in the vertical direction with respect to the progressing direction of the beam of light within a plane where said line spread function image is formed.

12. A method for measuring an anamorphic lens according to claim 9,
   wherein said second step measures profile irregularity of said anamorphic lens by observing the image on said focal plane at a time before and after the line spread function image is formed by moving said anamorphic lens forward and backward in the progressing direction of the beam of light.

13. A method for measuring an anamorphic lens including:
   a first step of converging a beam of light emitted by a light source toward an anamorphic lens and adjusting the anamorphic lens such that the beam of light reflected by said anamorphic lens forms a line spread function image on a focal- plane; and
   a second step of detecting tilt of a primary meridian of said anamorphic lens by observing changes of the image formed on said focal plane while rotating said anamorphic lens about an axis passing through the center of curvature within a plane where said line spread function image is formed and vertical to said plane.

14. A method for measuring a cylindrical lens including:
   a first step of converging a beam of light emitted by a light source toward a cylindrical lens and adjusting the same such that the beam of light reflected by said cylindrical lens forms a line spread function image on a focal plane; and
   a second step of detecting tilt of a generatrix of said cylindrical lens by observing changes if the image formed on said focal plane while sliding said cylindrical lens in the vertical direction with respect to the progressing direction of the beam of light within a plane where said line spread function image is formed.

15. A method for measuring an anamorphic lens including:
   a first sep of converging a beam of light emitted by a light source toward an anamorphic lens and adjusting said anamorphic lens such that the beam of light reflected by said anamorphic lens forms a line spread function image on a focal plane; and
   a second step of measuring profile irregularity of said anamorphic lens by observing the image on said focal plane at a time before and after the line spread function image is formed by moving said anamorphic lens forward and backward in the progressing direction of the beam of light.

* * * * *

UNITED STATES PATENT AND TRADEMARK OFFICE
CERTIFICATE OF CORRECTION

PATENT NO. :     5,351,119
DATED      :     September 27, 1994
INVENTOR(S) :
                 T. NAKATSUE It is certified that error appears in the above-indentified patent and that said Letters Patent is hereby corrected as shown below:

At the cover sheet, section [57] of the printed patent, line 12 of the Abstract, insert ---lens--- after "anamorphic".

At the cover sheet, section [57] of the printed patent, line 9 of the abstract, change "lends" to ---lens---.

At column 7, line 27 (claim 13, line 7) of the printed patent, change "focal- plane" to ---focal plane---.

At column 8, line 12 (claim 14, line 9) of the printed patent, change "if" to ---of---.

At column 8, line 20 (claim 15, line 3) of the printed patent, change "sep" to ---step---.

Signed and Sealed this

Twenty-fifth Day of April, 1995

Attest:

BRUCE LEHMAN

Attesting Officer    Commissioner of Patents and Trademarks